United States Patent [19]

Cole, Jr.

[11] Patent Number: 5,245,118
[45] Date of Patent: Sep. 14, 1993

[54] COLLAPSIBLE WASTE DISPOSAL CONTAINER AND METHOD OF DISPOSAL OF WASTE IN SUBDUCTION ZONE BETWEEN TECTONIC PLATES

[76] Inventor: Howard W. Cole, Jr., 2745 Waterworks Rd., Danville, Ky. 40422

[21] Appl. No.: 882,805

[22] Filed: May 14, 1992

[51] Int. Cl.⁵ ............................. B09B 1/00; B09B 3/00
[52] U.S. Cl. ................................... 588/250; 405/128; 588/249
[58] Field of Search ................. 405/128, 129; 588/249, 588/250

[56] References Cited

U.S. PATENT DOCUMENTS

| | | | |
|---|---|---|---|
| 4,178,109 | 12/1979 | Krutenat | 405/128 X |
| 4,316,814 | 2/1982 | Uerpmann | 405/128 X |
| 4,428,700 | 1/1984 | Lennemann | 405/128 |
| 4,738,564 | 4/1988 | Bottillo | 405/128 X |
| 4,877,353 | 10/1989 | Wisotsky | 405/128 |

FOREIGN PATENT DOCUMENTS

| | | | |
|---|---|---|---|
| 2742340 | 3/1979 | Fed. Rep. of Germany | 405/128 |
| 0023872 | 2/1977 | Japan | 405/128 |

OTHER PUBLICATIONS

"The Subduction of the Lithosphere", by M. Nafi Toksoz, *Scientific American Magazine*, Nov. 1975.
"Geosyclines Mountains and Continent–building," by Robert S. Dietz, *Scientific American*, Mar. 1972.
"Sea–Floor Spreading" by J. R. Heirtzler, *Scientific American*, Nov. 1971.
"Deep–sea muds hold tight to elements," by R. Monastersky, *Science News of the Week*.

Primary Examiner—Dennis L. Taylor
Attorney, Agent, or Firm—James R. Higgins, Jr.

[57] ABSTRACT

This invention provides a collapsible waste disposal container apparatus and a method of disposing of hazardous waste in the subduction zone between tectonic plates making up the earth's upper mantle.

1 Claim, 1 Drawing Sheet

COLLAPSIBLE WASTE DISPOSAL CONTAINER AND METHOD OF DISPOSAL OF WASTE IN SUBDUCTION ZONE BETWEEN TECTONIC PLATES

BACKGROUND OF THE INVENTION

Many countries with nuclear power are investigating deep geological disposal as a method of long term disposal of spent nuclear fuel and high-level waste such as from medicinal applications. The development and implementation of waste management strategies based upon geological disposal is becoming a preferred option of hazardous waste disposal. Conventional methods of disposal typically include burying the radioactive waste in geological repositories to isolate the waste in sedimentary rocks clay, or salt; igneous rocks such as granite; or metamorphic rocks. Abandoned drilling shafts or other deep wells are used to store radioactive waste; however, such waste generates considerable heat which must be dissipated for long term storage, and the possibility of leakage of the waste and contamination of ground water must be taken into consideration in site selection.

The collapsible waste disposal container in the claimed invention provides for the permanent disposition of any unwanted waste material such as radioactive fuel residue from nuclear power plants by burying the waste disposal container and waste in the ocean sediment deep in the subduction zone between the tectonic plates of the earth's mantle. The collapsible container method of disposal utilizes the earth's natural geological characteristics and evolutionary development as a means of neutralizing the waste according to the method of disposal described herein.

The earth's rigid outer crust of rock and upper mantle, the lithosphere, consists of about twelve rigid plates approximately 30 to 60 miles thick which move relative to a softer plastic underlayer called the asthenosphere which extends downward toward the center of the earth for approximately 240 miles. The lithosphere and the asthenosphere make up the upper mantle of the earth. Below the asthenosphere is the mesosphere or deep mantle. The temperature of the deep mantle increases with the distance below the earth's surface, typically reaching about 1200 degrees centigrade at 100 kilometers below sea level.

The tectonic plates are in a continuous state of movement caused by the up-welling of magma at the plate boundaries in the mid-ocean ridges. The Mid-Atlantic Ridge extends roughly from Greenland mid-way between Europe and the North American continents and between Africa and South America to approximately the end of the South American continent. The up-welling along this ridge causes the North American plate and the Eurasian Plate to become larger pushing the American and European plates farther apart.

Since the Earth does not become larger in diameter, the question of what becomes of the excess material in the lithosphere was a puzzle. Scientists theorize that the old lithosphere is subducted (pushed down) into the earth's mantle. These subduction zones form deep oceanic trenches adjacent to the island arcs of the western Pacific and along the western coast of South America. It is an accepted premise that the Himalayan Mountains were formed by the subduction of the Indian plate under the Eurasian plate.

It is reported that the subduction rate at which a plate descends perpendicular to the arc of the earth's surface varies from 0.5 to 9.5 centimeters per year. The middle American subduction zone located just off the Pacific coast of Central America has the greatest subduction rate of 9.5 centimeters per year.

More detailed information concerning plate tectonic geology is available from several scientific periodicals including: *Scientific American Magazine*. "The Subduction of the Lithosphere", by M. Nafi Toksoz, November 1975; *Scientific American Magazine,* "Sea-floor spreading", by Don L. Anderson, November 1971; *Scientific American Magazine,* "Geosynclines, Mountains and Continent-building", by Robert S. Dietz, March 1972; *Discover,* "Simmering Planet", by Ingrid Wickelgren; *Science News of the Week,* "Deep-Sea Muds Hold Tight to Hot Elements" by R. Monastersky, Volume 138.

The oceanic subduction zones, especially in the Pacific Ocean are associated with deep trenches. For example, the Marianas trench was explored by the bathysphere to a depth of 30,000 feet. The Peru/Chile trench is about eight kilometers, approximately 4.8 miles, deep. At the bottom of these deep trenches are collections of sediment. The sediments may be several kilometers thick and in turn provide some lubrication between the lower surface of the continental plate and the upper surface of the subducting plate.

A waste disposal package must be designed which takes into consideration such factors as the type of waste for disposal, the geological medium, the hydrology of the site, and the regulatory requirements. The waste disposal package typically includes the container and any buffering material inside or outside of the container. The waste disposal container must provide for the safe handling of the waste during storage, transportation, and placement of the waste for long term containment. If the waste is disposed using conventional methods in 300 to 1200 feet deep mines or wells in rock formations, it is necessary to design the container taking into consideration the ability of the container to prevent the release of radionuclides; the container material degradation to the environment and waste; the environment surrounding the waste container; buffer materials; and the pressure and temperature of the surrounding environment.

SUMMARY OF THE INVENTION

The present invention relates to a generally drum shaped collapsible waste disposal container incorporating a top end, a first cylindrical end section connected to the top end, a collapsible corrugated inner mid-section connected to the first cylindrical section opposite the top end, a second cylindrical end section connected to the corrugated inner mid-section opposite the first cylindrical end section, and a bottom end connected to the second cylindrical end section opposite the corrugated section. The collapsible waste disposal container may also include a tail fin attached to one end of the container and a conical shaped nose attached to the other end of the container opposite the tail fin to streamline the container for controlling the descent of the container toward a target area of the ocean floor.

The method of disposing waste in the corrugated collapsible waste disposal container includes filling the corrugated collapsible waste disposal container with solid or liquid waste material. Any entrapped air or gas is removed from the waste filled container by adding additional liquid to the waste filled container. The waste filled container is then sealed, and dropped into the ocean at a selected position over a deep ocean trench so that the waste filled container penetrates the sediment on the ocean floor.

BRIEF DESCRIPTION OF THE DRAWINGS

A better understanding of the present invention will be had upon reference to the following description in conjunction with the accompanying drawings in which like numerals refer to like parts throughout the several views and wherein:

The collapsible waste disposal container 10 of the present invention is designed to equivocate the internal and external pressures experienced with deep ocean disposal. As shown in FIG. 1, the present invention is generally drum shaped, designed having a top end 22 connected to a first cylindrical end section 18, a collapsible corrugated cylindrical inner section 12 connected to the first cylindrical end section 18 opposite the top end 22, a second cylindrical end section 20 attached to the inner corrugated section 12, and a bottom end 24 (not shown) connected to the second cylindrical end section 20, so that the container 10 can be compressed without destroying the integrity of the container 10. The container 10 is designed for permanent disposal of any waste material. The disposal of liquids requires that the container 10 be completely filled with fluid to eliminate any air or gas pockets before sealing the container 10. Disposal of solids is accomplished by filling the container 10 with the solid and then filling the container 10 with a liquid buffer solution to eliminate any air pockets before sealing the container 10.

Elimination of the waste material is accomplished by lowering and releasing the sealed container 10 containing the waste material over the deepest area of a subduction trench. As the container 10 descends, the external pressure of the water on the container 10 increases. If any residual or entrained gas or air from the solid or fluid is trapped within the container 10, the container 10 is designed so that the corrugated section 12 of the container 10 collapses to compress the waste material and fluid and maintain the pressure equilibrium between the external pressure of the sea water and the internal pressure of the waste material in solution.

Figure 1:
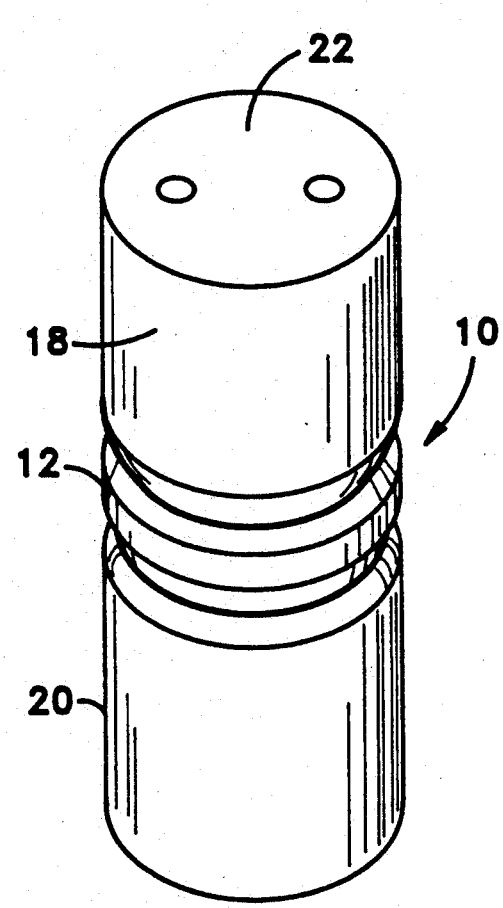
FIG. 1 is an elevated perspective view of the collapsible waste disposal, container of the present invention.
Figure 2:
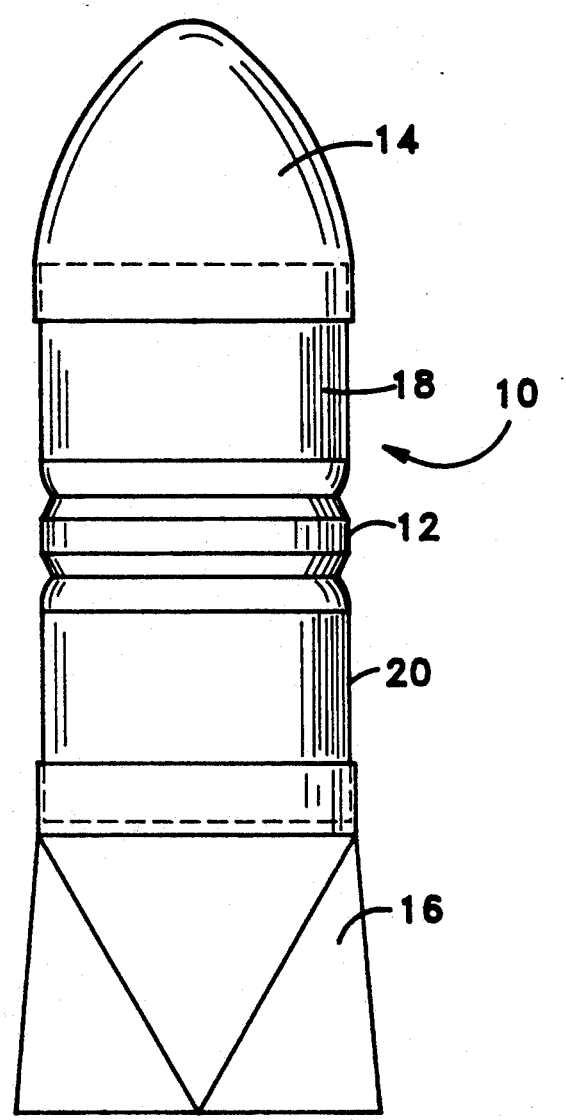
FIG. 2 is a side view of the collapsible waste disposal container of FIG. 1 including a nose portion and tail fin section for streamlining the container for more accurate positioning within a selected target area.

The container 10 as shown in FIG. 1, is fabricated from mild steel; however, it is contemplated that stainless steel, brass, copper, bronze, or other flexible materials would be applicable as well, depending upon the chemical composition and capability of the waste material with the container 10. The weight of gauge of the container 10 is not a critical factor in the design of the container 10, because the design of the container 10 dissipates and relieves the stress and strain on the container 10, so that the external pressure will be nominal even at the greatest depth of the oceans. As shown in FIG. 2, the container 10 is designed having a nose cone 14 and tail fins 16 to streamline the container 10 and provide for more accurate placement of the container 10 within the selected target area. It is anticipated that the container 10 could also be encapsulated within a streamlined shell such as a torpedo or bomb shaped capsule to provide for more accurate placement of the disposable container 10 within the selected disposal site.

It is anticipated that the container 10 will be exposed to some external pressures as its internal volume decreases due to residual stress in the container's 10 material which will resist the container's 10 deformation. The resulting slightly greater external pressure should be beneficial in preventing leakage.

The following calculations are approximate, but for the purposes of this invention will illustrate the magnitude of the forces involved. (Density of sea water=1.02; Pressure of 1 foot of water=0.4335 pounds per square inch; depth of Peru-Chile trench=4.8 miles; 1 mile=5,280 feet; 1 Atmosphere=14.7 pounds per square inch). (4.8 miles×5,280 feet per mile×0.4335 pounds per square inch×1.02=11,206 pounds per square inch) at the bottom of the trench at a depth of 4.8 miles. A pressure of 11,206 psi is equivalent to (11,206 psi/14.7 psi=763 atmospheres). *Mark's Standard Handbook for Mechanical Engineers* indicates a volume of water will be compressed from 1 cubic feet to 0.935 cubic feet. It is expected that the waste material and the liquid in the container 10 will be compressed as the container 10 descends to the bottom of the trench. Therefore, if the container 10 is filled completely with water, the internal volume is reduced to (0.935 times the original volume).

Many of the problems associated with the conventional geological disposition of waste materials in deep wells, mines, or buried in rock formations are alleviated using the disposal process of the present invention. It is well known that at a depth of approximately 4.8 miles in the deep trenches where subduction occurs, the pressure of water is 11,000 psi (760 atmospheres). There is little if any oxygen in the water to cause corrosion of the container 10 material, even mild steel.

The sediment at the bottom of a deep trench should be quite soft and fluid as there is little motion to the water to cause the silt to compact or be scrubbed away. The falling streamlined container 10 is expected to penetrate the sediment at least the length of the container, but more likely to a depth of twenty or more feet. Reference is made to an article in *Science News*, by R. Monasterskv, describing work performed in 1985 by Sarah Colley and John Thomson of the Institute for Oceanographic Sciences in Godalming, England. Studies of a 30 meter long core sediment sample from an abyssal plain in the northeast Atlantic Ocean revealed that over the last 500,000 years the sediments of uranium 238, uranium 234, thorium 230, radium 226, and lead 210 had not moved significantly. These measurements were made of the elements naturally existing in the ocean sediments. It would be expected that waste material within a sealed container 10 would survive at least as long or longer without vertical movement. At an estimated sediment accumulation rate of three inches per year, over a 1,000 year period, the container 10 will be buried under 250 feet of sediment. Based on the nominal subduction rate of 9.0 cm per year for the Peru-chile zone, the container 10 will be displaced toward or under the South American Continent 295 feet from where it was originally deposited 1,000 years before.

According to the *Scientific American* article "The Subduction of the Lithosphere" by Mr. M. Nafi Toksoz, the approximate temperature under the ocean or under continents will be about 1,000 degrees centigrade at about 75 kilometers below sea level. He estimates that the temperature rises to about 1,500 degrees centigrade at about 175 kilometers below sea level, and about 2,000 degrees centigrade at about 430 kilometers below sea level. Most metallic materials melt at or below 1500 degrees centigrade; therefore, waste material deposited in a subduction zone will eventually be melted and be consumed by the earth's inner mantle.

The foregoing detailed description is given primarily for clearness of understanding and no unnecessary limitations are to be understood therefrom, for modification will become obvious to those skilled in the art upon reading this disclosure and may be made without departing from the spirit of the invention and scope of the appended claims.

I claim:

1. A method of disposing of waste in a corrugated collapsible waste disposal container, comprising the steps of:

filling a corrugated waste disposal container with solid or liquid waste material, said corrugated waste disposal container comprising a generally conical shaped tip connected to a front end section, said front end section being connected in fluid communication to a flexible and deformable corrugated middle section, said middle section being connected in fluid communication to a rear end section, adding an additional liquid buffer solution to said waste filled container eliminating entrapped air or gas therein, and sealing said waste filled container, said corrugated collapsible waste filed disposal container being compressible by the external pressure of the sea water, so that the internal pressure of the waste material in solution is in pressure equilibrium with the external pressure of the sea water at various depths;

positioning said waste filled disposal container over a subduction zone between tectonic plates in a deep ocean trench; and placing said waste filled disposal container into the water over the deep ocean trench and into said subduction zone between an upper tectonic plate and a lower tectonic plate;

penetrating the lubricating layer sediment on the ocean floor in the subduction zone with said waste filled disposal container, so that said waste filled container is pushed under the upper tectonic plate during movement between the lower and upper tectonic plates, and the contents thereof are consumed within the central region of the earth.

* * * * *